Oct. 6, 1931.　　　T. S. VIEROW　　　1,826,230
EXTRUDING MACHINE
Filed Aug. 16, 1928　　　3 Sheets-Sheet 1
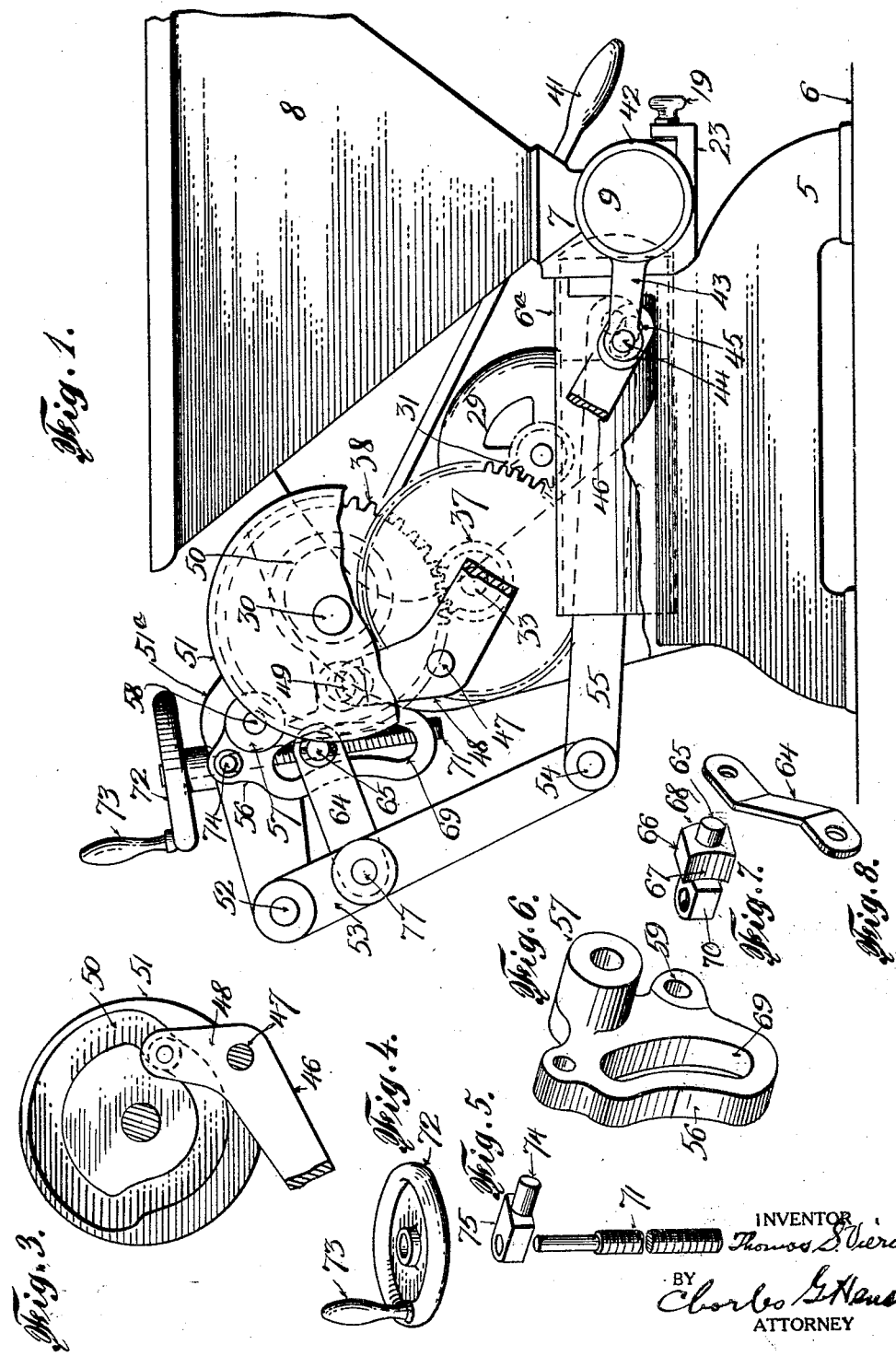

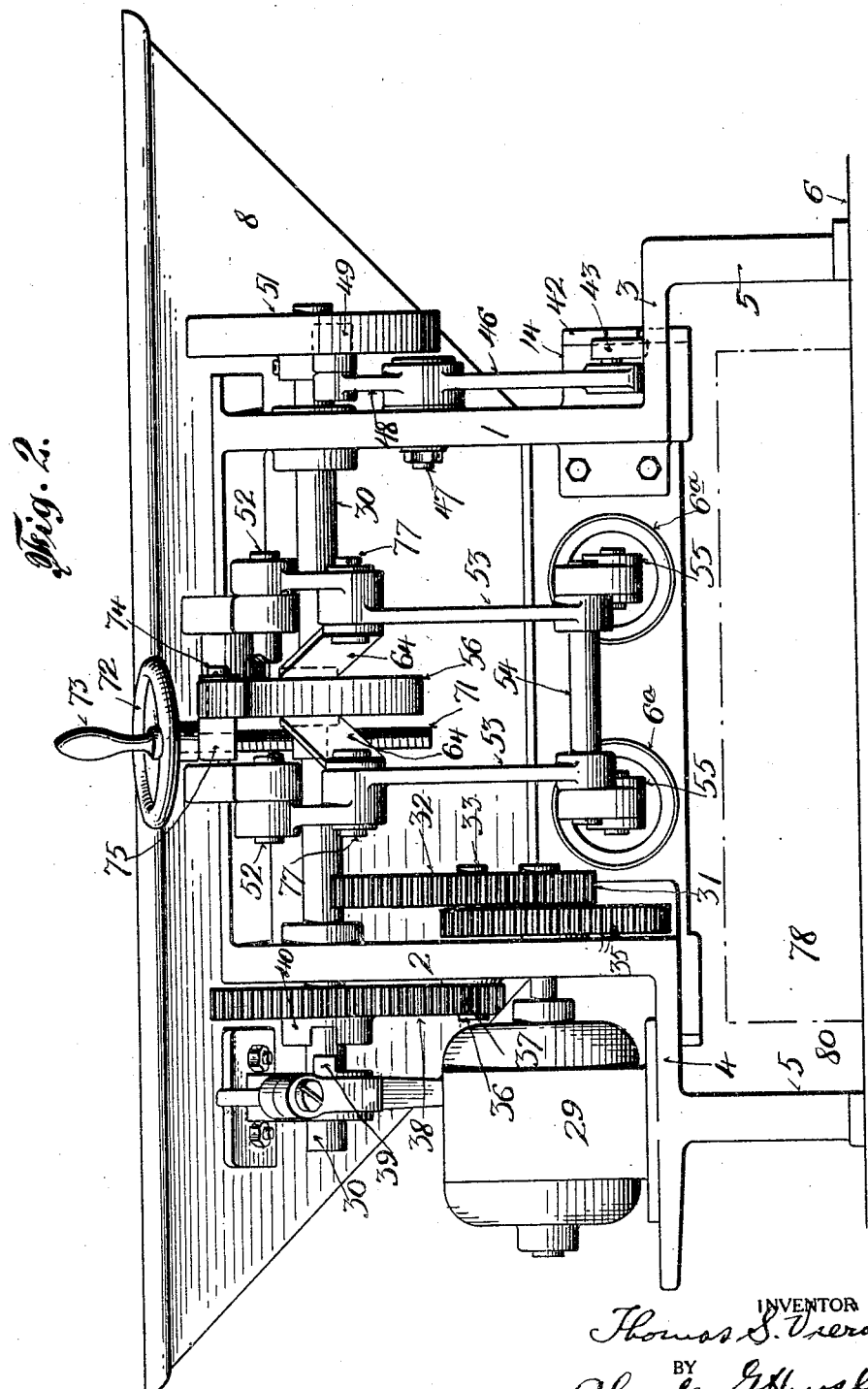

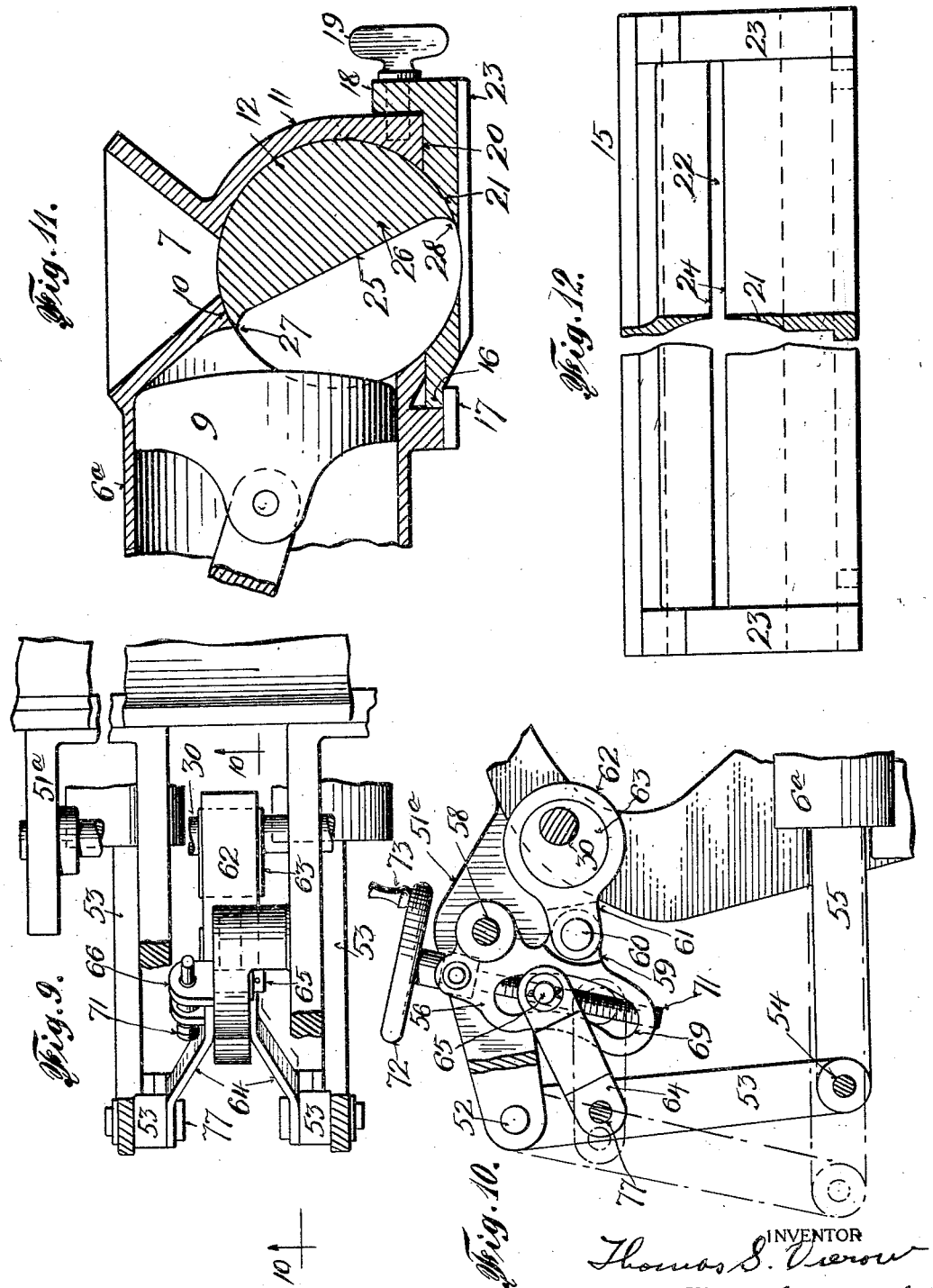

Patented Oct. 6, 1931

1,826,230

UNITED STATES PATENT OFFICE

THOMAS S. VIEROW, OF JERSEY CITY, NEW JERSEY

EXTRUDING MACHINE

Application filed August 16, 1928. Serial No. 299,980.

My invention relates to extruding machines and it is particularly useful in bakeries for extruding dough in order to discharge measured quantities of dough into individual receptacles in which the dough is to be baked or otherwise treated. I use the word dough broadly in the present case to mean either a stiff dough, such as may be used for baking bread, or a comparatively thin batter from which cakes, cookies and other articles may be made, and it is to be understood from the following description that the word dough is used in this broad sense. There are three main objects of advantages accomplished by the present invention. One of these is that the present machine is what may be called a bench machine; that is to say, the machine as a whole may be supported upon a bench or table where the work is to be carried on and the working parts of the machine are supported in elevated position above the bench, so that the pans, dishes, trays or other receptacles which are to be individually filled with the dough may be pushed along the bench into receiving position under the machine to receive a charge of dough. The machine is so constructed that a number of pans may be lined up side by side and advanced under the machine with one pan pushing against the other, and the row of pans may be pushed by hand. This arrangement eliminates the necessity for providing a mechanical conveyor for the pans and it makes it possible to reduce the machine to a small and compact structure with very few parts to keep in order and to be maintained clean.

The arrangement of parts making it possible to provide a bench machine having these characteristics will be set forth in the detailed descripton hereinafter. While I prefer to embody the invention in a bench machine to secure the above advantages, nevertheless there are other features which are not necessarily limited to an embodiment in a bench type of machine.

The present machine belongs to that class in which the charge of dough is drawn into a cylinder or receiving chamber by a piston by suction action in order to separate a given quantity or charge from the supply of dough, which charge, after it has been segregated from the main body of dough, is discharged by the reverse movement of the piston into the tray or other receptacle. The second branch of my invention relates to the novel construction and operation of the valve and the die cooperating therewith which controls the cutting off of the measured charge from the supply of dough and the closing of the charge chamber at the moment the charge is delivered into the pan or other receptacle; and these parts are so constructed that the charge of dough will be quickly delivered into the pan or other receptacle, free of any ribbons or pieces hanging from the die or discharge valve. Heretofore, there has been a tendency for the dough to adhere to the valve and die, so that strings or ribbons were left hanging as the charge of dough was fed into the pan, and these ribbons of dough interfere with the rapid and accurate discharge of the charge of dough into the pans and they also tend to be dragged over the edges of the pans and to discharge upon the bench. In the present case there are no ribbons or strips of dough adhering to the die or valve when the charge is delivered into the pan.

Another feature of the invention relates to the mechanism for operating the measuring and discharge devices. It is desirable that the piston operating mechanism shall be adjustable in order to regulate the action of the piston which draws in the dough, so that the measured charges may be adjusted to suit different requirements. It is desirable, however, that the forward or discharge stroke of the piston should terminate always at the same point, notwithstanding the regulation of its back stroke, in order that the measuring chamber or cylinder will be substantially empty regardless of the adjustment of the stroke of the plunger. In the present case I have provided a very simple and efficient device for regulating or adjusting the thrust of the piston, which device is so constructed and operated that the adjustment of the thrust of the piston may be regulated while the machine is in actual operation, so that the operator may quickly observe the effect of the adjustment on the delivery of the charges of dough to quickly arrive at the adjustment desired. This adjusting means includes a quadrant in which a bearing block is adapted to be adjusted concentrically with the pivotal point of one of the operating levers.

Other advantages and features of the invention will be set forth in the following detailed description of my invention.

In the drawings forming part of this application,

Figure 1 is a side elevation partly in section of an extruding machine embodying my invention in the preferred form, Figure 2 is an end elevation thereof looking at the machine from the left hand end of Figure 1, Figure 3 is a face view of a cam device for operating certain parts of the machine, Figure 4 is a perspective view of the adjusting handle, Figure 5 is a perspective view of parts for adjusting the bearing block, Figure 6 is a perspective view of the quadrant, Figure 7 is a perspective view of the adjustable bearing block, Figure 8 is a perspective view of one of the arms which are connected with the adjustable bearing block, Figure 9 is a sectional view showing in plan the quadrant, Figure 10 is a sectional view taken on the line 10—10 of Figure 9, Figure 11 is a vertical, sectional view through the measuring and discharge valve and the die, and Figure 12 is an inverted plan view of the die.

I have illustrated my invention in an embodiment in which there are two plungers and two cylinders for discharging the dough through a common die into the same container, but it will be understood that the invention may be embodied either with a single piston or with any number greater than the number herein shown, and the construction shown will be described in detail without intending to limit the scope of the invention to the exact structure shown.

In the drawings I have shown the various parts of the machine assembled upon and associated with a frame which includes parallel side members 1, 2 having lateral extensions 3, 4 and downwardly extending legs or feet 5 which are adapted to rest upon any suitable support where the work is to be carried on, such as upon a bench or work table 6. The entire machine may be placed in any convenient position upon the work table or bench and it may be shifted from one bench to another or temporarily removed for cleaning the bench. No part of the mechanism extends below the plane of the bench, so that the machine as a whole is portable and is entirely independent of the bench and requires no special construction of the latter.

The measuring cylinders are similar to each other, so that a description of one will answer for both. These cylinders are shown at 6a mounted in a horizontal position in the framework of the machine on a plane slightly above the upper ends of the legs 5 and in fact all the working parts of the machine are preferably elevated so that the space substantially from the lateral portions 3, 4 of the frame to the bench is left clear for the reception of the containers as will be more fully described hereinafter. At one end of the the cylinders there is a throat 7 for the cylinders for feeding the dough thereto, and above the throat there is a hopper 8 which is adapted to receive a quantity of dough to be discharged through the throat 7 and to be drawn into the cylinders.

Within each cylinder there is a reciprocating piston 9. The bottom of the throat 7 is provided with a curved surface 10 and there is a curved wall 11 extending from the throat to provide a cylindrical seat in which the oscillating valve 12 is adapted to move. There is a valve for the throat 7, preferably formed of a single body having cylindrical ends 13 adapted to oscillate within the tubular extensions 14 of the casing which includes the throat 7. The valve is arranged to engage the arcuate, inner surfaces 10 at the bottom of the throat and around the end wall 11 and to form a close fitting connection which will, however, permit the valve to oscillate freely on its own axis. At the lower side of the valve body there is a removable die member 15 which has one lip 16 adapted to rest upon a bracket 17 formed in the frame below the cylinders and it has an upwardly extending front flange 18 provided with bolts 19 threaded into the end wall 11 whereby the die may be detachably secured against the bottom face 20 of the valve casing.

In its upper surface the die is provided with a circular recess 21 which is formed on the same arc as the outer surface of the valve, so that this surface will conform closely to the periphery of the valve. The opening through which the dough is extruded is shown in the present case as a single slot 22 extending lengthwise of the die, although it will be understood that the opening may be divided into a number of separate openings in line with each other in accordance with known practice. Where the extruding aperture is a single slot, as shown herein, I prefer to provide bottom rails 23 at each end of the die beyond the ends of the slot 22 to retain the die in a single member. It will be observed that where the arcuate recess 21 cuts through the bottom plane of the die there are formed two sharp edges 24 which define the sides of the open slot 22.

The valve body within the valve casing, that is, within the portion which receives the dough, is cut away, as shown at 25, on one side, leaving substantially a D shape half as shown at 26. At one side of the flat face 25 the metal projects at 27 to form a sharp cutting edge for definitely cutting or dividing the dough at the bottom end of the throat 7. At the opposite side of the valve the metal projects at 28 to form a rather sharp cutting edge which will co-operate with the edges 24 of the slot 22 to cut or divide the dough which is being discharged from that which may remain within the cylinder or valve.

I will now describe the mechanism for oscillating the measuring valve and for reciprocating the pistons.

I have shown a motor 29 mounted upon the lateral member 4 of the frame, and this motor serves to drive the main operating shaft 30 through a chain of reduction gears as follows:

There is a small pinion 31 on the motor shaft which meshes with and drives a larger gear 32 on the shaft 33 mounted in one of the frame standards. On this latter shaft there is a small gear 37 which meshes with and drives a larger gear 38 which is mounted upon the shaft 30. There is a clutch member 39 which is connected with the main shaft 30 by a feather and this clutch member is adapted to be shifted along the shaft 30 to engage with the clutch member 40 formed on one side of the gear 38 and when these clutch members are thrown in by operation of the lever 41 shown in Figure 1, the motor 29 is connected through the chain of gears described and will operate the main shaft 30. When the clutch member 39 is disengaged from the clutch member 40 by the operation of the hand lever 41, the driving motor will be disconnected from the main shaft and all of the mechanism will be thrown out of operation. The various mechanical movements are taken from this main shaft.

There is a strap 42 fastened to one end of the valve body and it is provided with an arm 43 extending outwardly therefrom and this lever arm is provided with a pin 44 which engages in an elongated slot 45 in one end of the lever arm 46 so that the latter is pivotally connected with the lever arm 43 so that it may oscillate the valve body; and the elongated opening 45 allows the pin 44 to travel therein.

The lever of which the arm 46 forms part is mounted to rock on the stud 47 and this lever has a second and shorter arm 48 which carries a roller 49 that travels in the groove 50 of the cam 51 which is mounted on the main shaft 30.

It will be apparent from the foregoing description that when the main shaft 30 revolves, the cam will act on the roller 49 and oscillate the lever 48, 46 and this will operate through the lever arm 43 to oscillate the valve body.

On the upper part of the frame of the machine there are brackets 51a which extend forwardly and are provided with a shaft 52 on which are pivotally mounted the lever arms 53, the shaft 52 forming the fulcrum point for these lever arms. These lever arms extend downwardly and are pivotally connected at 54 with links 55 which extend forwardly into the bores of the respective cylinders where their forward ends are pivotally connected to the respective pistons.

There is a quadrant 56 having a laterally extending boss 57 which is journaled on the shaft 58, so that the quadrant is adapted to rock with this shaft as its fulcrum. The quadrant is provided with an extension 59 forming an ear to receive the pivotal pin 60 which also passes through an aperture in the arm 61. The latter arm is a fixed portion of an eccentric strap 62 which surrounds the eccentric disc 63 fixed to the main shaft 30. Through these connections the quadrant is oscillated upon the axis of the shaft 58.

There are links 64 pivotally connected with the lever arms 53 (there being two of the latter where there are two pistons) and these links extend around opposite sides of the quadrant and are pivoted on the fulcrum pin 65 which passes through the pivoted block 66. The pivoted block 66 is a concavo-convex on its outer sides 67, 68 to correspond with the curvature of the arcuate slot 69 in the quadrant. One end of the pin 65 projecting from the bearing block 66 is provided with a threaded block 70 through which the screw 71 passes, the latter being provided at its upper end with a wheel 72 and operating handle 73 by means of which the screw 71 may be turned to cause the bearing block 66 to move along the arcuate slot 69.

The upper end of the quadrant member is provided with a laterally extending stud 74 which is freely revolvable in the quadrant member and on one end this stud carries a sleeve 75 through which the screw 71 passes and on which the adjusting wheel 72 rests. There is a link 64 for each piston to correspond with the lever arms 53 and the links 55 for each piston, and in the duplex arrangement shown herein both of the links 64 are connected to the same bearing block 66 by a pivotal connection by the pin 65.

Operation

A supply of dough or batter will be placed in the hopper 8 and the machine may be started by throwing the hand lever 41 to throw the clutch member 39 into engagement with the clutch member 40. The motor 29 will operate through the chain of gears to drive the main shaft 30 and from the latter the various devices described herein are operated. With each revolution of this main shaft the cam 51 will operate on the roller 49 to oscillate the lever 48, 46 and the latter arm of this lever will act on the pin 44 to oscillate the lever arm 43 which is connected directly to the valve member.

At each revolution of the main shaft the eccentric disc 63 will operate the eccentric strap 62 and through the pivotal connection 60 this will cause the complete oscillation of the quadrant about its shaft 58. The oscillating movement of the bearing block 66 which will be on an arc concentric with the shaft 77 will act through the links 64 to swing the lever arms 53 so that the links 55 are first moved to the left in Figure 1 and then to the right. These links operate the two pistons in unison. At the time the pistons move to the left in Figure 1, the valve body is in the dotted line position shown in Figure 11, so that at this time the bottom end of each throat 7 is open with the interior of one of the cylinders 6a and the slot 22 of the die is covered by the lower portion of the valve as indicated by the dotted line in Figure 11.

When the pistons move to the left in Figure 1 and likewise in Figure 11, the suction action of the pistons draws the dough into the cylinders and the quantity thus taken in will depend upon the longitudinal thrust of the pistons. When the lever arms 53 move to the right the valve will have been reversed in position so that it lies in the full line position shown in Figure 11. At this times the upper portion of the valve closes the bottom of the throat 7 and the cut-off edge 28 is moved back so that the slot 22 of the die remains open. As the lever arms 53 move to the right, the pistons move back in the reverse direction to that previously described, or toward the throat, so that the dough which was taken in on the first half of the stroke is extruded past the valve and through the slot 22 in the die, and it is discharged into the receptacle 78 placed below the die.

Owing to the sharp edges 24 defining the sides of the slots of the die, and owing to the sharp edge 28 of the valve the dough is completely severed upon the next oscillation of the valve into the dotted line position in Figure 11, and as there is no substantial surface for the dough to adhere to, it drops immediately into the receptacle without leaving any connected strands or ribbons. In other words, it drops free and clear of the die.

The adjusting slot 69 in the quadrant is struck on an arc concentric with the shafts 77 by which the links 64 are pivotally connected with the levers 53. As a result of this, the movements imparted by the eccentric disc 63 acting through the strap 62 upon the oscillating quadrant always cause the levers 53 to go to the right in Figure 1 the same point, or in other words, the pistons always go to the right in Figure 11 or toward the throats 7 so that their movement in this direction always terminates at the same point, which movement tends to extrude the greater portion of the dough from the ends of the cylinders.

By turning the hand wheel 72, and this may be done either while the machine is idle or while it is in operation, the bearing block 66 may be caused to move by the screw 71 either upwardly or downwardly, following the curvature of the arcuate slot 69 in which the bearing block is guided. During this adjustment, the screw 71 may rock with its supporting sleeve 75 on the stud 74 and the pin 65 may turn within the bearing block to allow for the difference in angle between the adjusting screw 71 and the bearing block.

The adjustment of the bearing block toward the bottom of the slot 69 will cause the levers 53 to move a greater extent because of the oscillation of the quadrant from the shaft 58. That is to say, as the bearing block is moved a greater distance from the shaft 58 there will be a greater thrust imparted to the levers 53 by the operation of the eccentric disc 63. Conversely, if the bearing block is moved upwardly in the slot 69 the swing of the levers 53 will decrease; and if the bearing block is moved until it is on a line passing through the shaft 58 on which the quadrant and the pin 65 on which the links 64 pivot respectively, there will be almost no movement imparted to the levers 53 by the quadrant. This is an important feature of the present invention because it allows the plunger movement to be adjusted down to a point where there is only a slight movement whereas in former devices the adjustment could not be made for a minimum discharge of the dough. On account of the slot 69 in the quadrant being formed on an arc concentric with the shafts 77 on which the links 64 are pivoted, the pistons will always move forwardly to the same position and it is only the outward thrust which is increased or decreased by the adjustment of the bearing block in this slot. The use of the quadrant with the adjustable bearing block provides a much simpler device for adjusting the thrust of the cylinder than in previous machines for extruding dough.

The containers or pans 78 for receiving the dough may be moved sidewise one after the other into and through the space below the lateral portions 3, 4 of the frame and between the side legs 5. The pans may be placed against each other sidewise so that their longest dimension is crosswise of the machine, permitting a long die to be used and a multiple of pistons to be used, so that the charge of dough for a given pan may be quickly discharged.

The space 80 within the frame of the machine permits the pans to be thus advanced sidewise to bring them successively into position to receive the charge of dough by simply being pushed by hand without special conveying machinery. The present machine may, therefore, be placed in any position upon a bench and it is complete in itself without requiring any mechanism to attach it to the bench. The machine is, therefore, very compact and portable.

Having described my invention, what I claim is:

1. An extruding machine including a cylinder, a piston for drawing dough into and extruding it from said cylinder, and means for operating said piston, including a rocking member, a link pivotally connected with said rocking member, a quadrant and means for oscillating it, and means adjustable in said quadrant concentrically of the point of pivotal connection of said link and rocking member, to which means said link is pivotally connected.

2. An extruding machine including a cylinder, a piston for drawing dough into and extruding it from said cylinder, and means for operating said piston, including a rocking member for reciprocating the piston, a pivotally mounted quadrant, an eccentric and a pivotal connection between the eccentric and said quadrant to effect the oscillation of said quadrant, a link pivotally connected with said rocking member and with said quadrant whereby said rocking member is operated by the quadrant, the member connecting said link and quadrant being adjustable concentrically with the pivotal point of said link to vary the stroke of said rocking member.

3. An extruding machine including a cylinder, a piston for drawing dough into and extruding it from said cylinder, and means for operating said piston, including a rocking member for reciprocating the piston, a link pivotally connected with the rocking member, a pivoted quadrant and means for oscillating the quadrant on its pivot, the quadrant having an arcuate slot extending from a point adjacent a line projected through the pivotal point of said link and the pivotal point of said quadrant, and an adjustable bearing member in said slot to which said link is connected for transmitting the movements of the quadrant to said rocking member, said bearing member being adjustable in said slot concentrically of the point of connection between said link and said rocking member.

4. An extruding machine including a cylinder, a piston for drawing dough into and extruding it from said cylinder, and means for operating said piston, including a rocking member, a pivoted quadrant and means for oscillating the same, said quadrant having an arcuate slot and a bearing member adjustable therein, means for adjusting said bearing member, and a link pivotally connected with said rocking member and with said bearing member to effect the operation of said rocking member from said quadrant.

5. An extruding machine including a cylinder and piston for drawing dough into and extruding it from said cylinder, a housing having a circular seat in which a valve is adapted to oscillate, a cylindrical valve arranged to oscillate in said seat for the purpose of controlling the feed of dough into and the discharge thereof from said cylinder, and a removable die member detachably secured to said housing and having an arcuate recess conforming to and in contact with the periphery of said oscillating valve, said die member having a discharge opening through said recess portion whereby the valve will oscillate within said housing and said die member and control the opening and closing of said discharge opening of said die member.

6. An extruding machine including a cylinder and a piston for drawing dough into and extruding it from said cylinder, a housing having a circular seat in which a valve is adapted to oscillate, a cylindrical valve arranged to oscillate in said seat for the purpose of controlling the feed of dough into and the discharge thereof from said cylinder, and a removable die member detachably secured to said housing and having an arcuate recess conforming to and in contact with the periphery of said oscillating valve, said die member having a discharge opening through said recess portion and defined by a sharp edge, said valve having a recess to permit the passage of dough from said cylinder to said die, and having an undercut sharp edge co-operating with the sharp edge of the die member whereby said valve oscillating within said housing and said die member will control the opening and closing of said discharge opening of said die member.

7. An extruding machine including a cylinder and a piston for drawing dough into and extruding it from said cylinder, a housing having a circular seat in which a valve is adapted to oscillate, a cylindrical valve arranged to oscillate in said seat on an axis disposed at right angles to the axis of movement of said piston for the purpose of controlling the feed of dough into and the discharge thereof from said cylinder, and a removable die member detachably secured to said housing and having an arcuate recess conforming to and in contact with the periphery of said oscillating valve, said die member having a discharge opening through said recess portion defined by a sharp edge, said oscillating valve having a lateral opening therein to permit dough to pass from said cylinder to the opening in said die member and having a sharp edge adjacent said valve opening co-operating with the sharp edge of said die member, said valve being adapted to co-operate with said die member to control the opening and closing of the discharge opening of said die member.

Signed at the city, county, and State of New York, this 30th day of July, 1928.

THOMAS S. VIEROW.